United States Patent
Park (10) Patent No.: US 12,409,587 B2
(45) Date of Patent: Sep. 9, 2025

(54) PRODUCING METHOD OF FOAM SHEET FOR SHOE WITH RECYCLED PU SCRAP POWDER

(71) Applicants: SAM BU FINE CHEMICAL CO., LTD., Gimhae-si (KR); Heedae Park, Busan (KR)

(72) Inventor: Heedae Park, Busan (KR)

(73) Assignees: SAM BU FINE CHEMICAL CO., LTD., Gimhae-si (KR); Heedae Park, Busan (KR)

( * ) Notice: Subject to any disclaimer, the term of this patent is extended or adjusted under 35 U.S.C. 154(b) by 0 days.

(21) Appl. No.: 18/817,192

(22) Filed: Aug. 27, 2024

(65) Prior Publication Data

US 2025/0083365 A1    Mar. 13, 2025

(30) Foreign Application Priority Data

Aug. 28, 2023  (KR) .................. 10-2023-0112726

(51) Int. Cl.

| | |
|---|---|
| *B29C 44/08* | (2006.01) |
| *B29C 44/34* | (2006.01) |
| *B29C 59/02* | (2006.01) |
| *B29K 75/00* | (2006.01) |
| *B29L 31/50* | (2006.01) |

(52) U.S. Cl.
CPC .......... *B29C 44/08* (2013.01); *B29C 44/3442* (2013.01); *B29C 59/02* (2013.01); *B29K 2075/00* (2013.01); *B29L 2031/504* (2013.01)

(58) Field of Classification Search
CPC . B29C 44/3461; B29C 44/027; B29C 44/025; B29C 44/083; B29C 59/02; B29C 44/3442; B29C 44/08
See application file for complete search history.

(56) References Cited

FOREIGN PATENT DOCUMENTS

| KR | 10-2009-0086791 A | 8/2009 |
|---|---|---|
| KR | 10-2011-0019960 A | 3/2011 |
| KR | 10-2015-0084962 A | 7/2015 |
| KR | 10-1569659 B1 | 11/2015 |
| KR | 10-2018-0084340 A | 7/2018 |
| KR | 10-2096984 B1 | 4/2020 |
| KR | 10-2131606 B1 | 7/2020 |
| KR | 10-2021-0016441 A | 2/2021 |

*Primary Examiner* — Stella K Yi
(74) *Attorney, Agent, or Firm* — Goldilocks Zone IP Law (57) ABSTRACT

The present invention relates to a method of manufacturing a foam sheet for shoes containing recycled PU scrap powder, the method of manufacturing the foam sheet, including eco-friend Polyurethane (PU) foam composition prepared by water foam, is provided by first mixing recycled PU scrap powder with polyol and then reacting with the secondary addition of recycled PU scrap powder by controlling the process conditions and processing speed through a side-feeder, it is possible to prevent the viscosity of the raw material from rising, so that even if a larger amount (less than 60 wt %) of recycled material is used than before, the quality of the product is equivalent to that of conventional shoe insoles or shoe uppers.

4 Claims, 4 Drawing Sheets

PRODUCING METHOD OF FOAM SHEET FOR SHOE WITH RECYCLED PU SCRAP POWDER

CROSS-REFERENCES TO RELATED APPLICATION

The present application claims priority under 35 U.S.C. § 119 to Korean Patent Application No. 10-2023-0112726 filed on Aug. 28, 2023 in the Korean Intellectual Property Office, the disclosures of which are incorporated herein by reference in its entireties.

FIELD OF TECHNOLOGY

The present invention relates to a method of manufacturing a foam sheet for shoes containing recycled PU scrap powder, and more specifically, to an eco-friendly polyurethane foam composition by water foam, i.e., water blown, where recycled PU scrap powder is first mixed with polyol and then by reacting the recycled PU scrap powder with secondary addition through a side-feeder, the quality of shoe foam sheet products such as shoe insoles or foam packages for shoe uppers is good even if a larger amount of recycled material is used than before. It relates to a method of manufacturing foam sheets for shoes containing recycled PU scrap powder.

BACKGROUND TECHNOLOGY

In general, various kinds of shoes such as shoes, sneakers, and hiking boots include an upper leather forming the appearance of shoes, an outsole coming in contact with the ground, a midsole installed on the upper side of the outsole, and an insole coming in contact with the sole of the foot. At this time, the insole is installed on the inner bottom surface of the shoe and is shaped to cushion the impact force from the ground to the sole of the foot during walking and to improve comfort and hygiene for a wearer.

The shoe insole as described above has various functions added based on the research result that the health of the foot is a very important factor for the human body. For example, many materials have been developed for insole to be molded into an ergonomic structure capable of effectively absorbing impact or to improve sweat absorption, antibacterial and deodorization functions, and recently, a technology for preventing frostbite in winter by providing a heating function by incorporating a heating wire in a shoe insole has been proposed.

Materials commonly used for shoe insoles may include polyurethane (PU), ethylene-vinyl acetate (EVA), polyethylene (PE), and latex materials, which are manufactured in foam sheets by foaming, which are typically bonded to a woven fabric of natural or artificial fibers using adhesives or hot melt films.

This adhesion process has the advantage of reducing the process time and number of workers compared to the sewing process by applying liquid adhesive to the adherend and then adhering it to the fabric while drying it to volatilize the solvent or moisture. To maximize cost savings, many processes are now using thermoplastic hot melt films to bond fabrics instead of liquid adhesives, and the foam sheets bonded with fabrics as described above are typically cut into foam sheet products for footwear, such as shoe insoles or foam packages for shoe uppers, or they are placed in molds and formed and cut by heat press.

Korea Patent Publication No. 10-2009-0086791 (Shin Seung-wook) discloses a high-density poly having a density of 0.8 to 1.0 g/cm³ to prevent slipping of the foot by attaching it to the bottom of the shoe and to have excellent shock absorption and resilience. It relates to an adhesive shoe cushion using high-density polyurethane foam may include a cushion layer 10 formed by heat-treating urethane foam and then pressing it with a cooling press to cut and mold into the shape of a shoe cushion; an adhesive layer 20 coated with polyacrylate, natural rubber or synthetic rubber adhesive, or hot melt adhesive on the surface to which the cushion layer 10 is attached to the adherend; and a release paper layer 30 protecting the adhesive layer 20, wherein the cushion layer 10, an adhesive layer 20, and the release paper layer 30 are sequentially stacked.

In addition, in Korean patent No. 10-1569659 (Nike Innovate C.V.), a method for molding a foamed article, comprising: placing a desired amount of thermoplastic polyurethane foam beads in a compression mold in the shape of an article, wherein the thermoplastic polyurethane foam beads have a density of from about 0.01 to about 0.3 g/cm³; closing the mold; bringing the mold to a peak temperature of from about 130° C. to about 180° C. over a period of from about 300 to about 1500 seconds; cooling the mold to a temperature of from about 5° C. to about 80° C. over a period of from about 300 to about 1500 seconds within about 30 seconds after the peak temperature is reached; and removing the article, is disclosed.

In addition, Korean Patent Nos. 10-2096984 (BASF SE) is a combinatorial foam containing a matrix composed of polyurethane foam and the thermoplastic polyurethane foam particles contained therein, matrix and particle composed of a polyol component and a polyisocyanate component, respectively, which are equal to or more than 50 wt % of the basic building blocks forming the matrix and particles, and 50 wt % or more of the basic constituent blocks forming the polyisocyanate component of the matrix and particles are the same, thereby relates to a combinatorial foam in which the matrix is completely continuous and the foam particles in the matrix are few or partially independent.

According to the dot-composite shoes insole using an adhesive resin mixed with hydrophobic nano-silica and producing method thereof developed in Korean Patent No. 10-2131606, which is invented by the same inventor of the present application, by compounding nanosilica containing a hydrophobic functional group into the adhesive resin, dispersibility in the adhesive resin is improved, water resistance is enhanced, and tensile strength is increased. In addition, the adhesive resin is molded by transferring a intaglio dot pattern of an in the shape of the insole of the shoe using a transfer roller formed in a mesh-type to one side of the foam and the fabric, thereby preventing the phenomenon of overflow, which not only has excellent adhesion performance, but also has the effect of securing uniform adhesion strength and excellent durability than conventional products even when applying an adhesive resin with a thinner thickness (10~40 µm), and reducing product weight and material costs while producing a soft texture.

The above Patent No. 10-2131606 disclosed that removing the adhesive resin applied to the surface of the transfer roller other than an intaglio dot pattern, by transferring and the adhesive resin applied to the surface of a transfer roller having a mesh-type dot pattern formed in the shape of a shoe insole onto one of a foam and a fabric, pressing it. Therefore, about 35 to 40% of the scraps generated after cutting the shoe insole shape can be easily separated into the respective foam and fabric and recycled, thus realizing environmental friendliness and cost reduction.

On the other hand, as polyurethane foam compositions containing a large amount of recycled materials are conventionally manufactured using binders, there is a problem that the hardened binder inside the foam sheet causes hard spots in the product and low elasticity, a method for manufacturing an eco-friendly polyurethane foam composition has developed, which includes a water-blown foam by first mixing recycled PU scrap powder with polyol and then adding recycled PU scrap powder through a side-feeder while reacting with a secondary addition of recycled PU scrap powder, thereby producing a foam sheet for footwear with a good quality of a foam sheet product such as a foam package for shoe insoles or shoe uppers even if a larger amount of recycled material is used than conventionally according to aspects of the present invention.

RELATED ART DOCUMENTS

Patent Documents

Korea Patent Application Publication No. 10-2009-0086791 (Publication date Aug. 14, 2009).
(Patent Document 0002) Korea Patent No. 10-1569659 (issued date Nov. 16, 2015).
(Patent Document 0003) Korea Patent No. 10-2096984 (issued date Apr. 3, 2020).
(Patent Document 0004) Korea Patent No. 10-2131606 (issued date Jul. 8, 2020).

DESCRIPTIONS OF THE INVENTION

Problems to be Solved

The purpose of the present invention is to prevent an increase in viscosity of raw material by firstly mixing recycled PU scrap powder with polyol with an environmentally friendly water-blown polyurethane foam composition, and then adjusting processing conditions and processing speed through a side-feeder to secondly add and react the recycled PU scrap powder. Accordingly, the present invention provides a method for manufacturing a foam sheet for footwear containing recycled PU scrap powder that can reduce the cost of raw materials and dramatically reduce carbon emissions by forming a foam sheet for footwear, such as a foam package for shoe insoles or shoe uppers, with a product quality equivalent to that of conventional foam sheets, even when a larger amount (within 60 wt %) of recycled material is used than in the past.

Means for Solving the Problems

A manufacturing method of foam sheets containing recycled PU scrap powder for shoes are made using a polyurethane foam composition, which includes polyol, isocyanate, chain extender, and in a ratio of 0.1 to 2 wt % of water as a foaming agent as raw materials, a step of preparing a polyurethane foam composition mixed with the polyol in a ratio of 10-20 wt % of recycled PU scrap powder based on the total weight of the polyurethane foam composition S100; a step of preparing a polyurethane block foam by adding and reacting the recycled PU scrap powder in a ratio of 10-40 wt % based on the total weight of the polyurethane foam composition through a side feeder S200; a step of cutting the polyurethane block foam to a desired thickness to form a polyurethane foam sheet S300; a step of bonding the polyurethane foam sheet cut to the desired thickness with fabric S400; and a step of cutting the polyurethane foam sheet combined with the fabric into a product of a specific shape, or placing it in a mold and molding and cutting it into a product of a specific shape by heat pressing S500.

According to a preferred embodiment of the invention, the recycled PU scrap powder is ground to a size with an average particle size of 50 to 300 μm, and the adhesive used in the step (S400) of bonding the polyurethane foam sheet with the fabric is a liquid adhesive or hot melt film comprising a resin composition of at least one type selected from thermoplastic polyurethane (TPU) or ethylene vinyl acetate (EVA), wherein the product of the predetermined shape is at least one type of foam package for shoe insoles or shoe uppers.

Effects of the Invention

The method of manufacturing a foam sheet for footwear containing recycled PU scrap powder according to the present invention is an eco-friendly polyurethane (PU) foam composition made by water foaming, water-blown, in which the recycled PU scrap powder is mixed with polyol in the first stage, and then the recycled PU scrap powder is reacted while adding the recycled PU scrap powder in the second stage by appropriately controlling the processing speed of the process through a side-feeder to prevent the viscosity of the raw material from rising. Accordingly, even if a large amount of recycled materials (less than or equal 60 wt %) is used, a foam sheet for shoes such as a shoe insole or a foam package for uppers of shoes having the same quality as an existing product is formed, so raw material costs can be reduced and carbon emission can be drastically reduced.

DETAILED DESCRIPTION

Hereinafter, a method for producing a foam sheet for shoes containing recycled PU scrap powder of the present invention is to be described with reference to the drawings. However, this is to illustrate the invention to be easily carried out by a person with ordinary skills in the art to which the present invention belongs, and does not imply that the technical ideas and categories of the present invention are limited.

In general, polyurethane resin is a resin produced based on a urethane bond generated by the reaction of an isocyanate group (—NCO) and a hydroxyl group (—OH) in a polymer, and its raw materials may include polyol, isocyanate, and a chain extender, etc. By adjusting the ratio of soft and hard segments that make up polyurethane, it is possible to design a variety of fields, from elastic products such as rubber to hard products such as plastic.

The polyurethane resin has excellent film strength and adhesive strength, thereby being able to manufacture a thin coating film. The coating film has excellent elasticity, thereby being able to be manufactured into a soft porous film or a film sheet, thereby imparting moisture permeability and air permeability. In addition, the polyurethane resin has excellent cold resistance, and is processed without using a plasticizer, thereby having less workability problems caused by the plasticizer.

In addition, the polyol is an active hydrogen compound used to react with isocyanate to prepare polyurethane, wherein the polyol has two or more active hydrogen groups such as hydroxyl groups, carboxyl groups, and amine groups in the molecule, and has a direct effect on the physical properties of the polyurethane by using various types according to the molecular structure, molecular weight, functionalities, and OH-value.

For example, a polyurethane using a polyester polyol is a polyether compared to polyurethane using polyol, it has higher tensile strength, hardness, and elongation, and has excellent flame retardancy, as well as excellent chemical resistance and chemical resistance, so it is resistant to oxidation and has excellent adhesion to various fabrics made of polyester or nylon. unlike polyether polyol, it has a property of hydrolysis, so its water resistance is weak. However, since polyurethane using polyether polyol has excellent elasticity, can be used in high temperature and high humidity environments, and shows excellent durability against acids and alkalis, it is preferable to use them alone or in combination depending on the application.

Polyurethane (PU) is produced when polyether made by polymerization of ethylene oxide is mixed with diisocyanate, and urethane is a mixed amide-ester produced when an alcohol group reacts with isocyanate, and when triol is used instead of diol, cross-linking occurs to produce thermosetting polyurethane.

Accordingly, in a preparing a foam sheet for shoe using the polyurethane foam composition containing polyol, isocyanate, chain extender, and 0.1~2 wt % of water as a foaming agent as raw materials according to the present invention, the polyurethane foam composition may contain recycled polyurethane (PU) powder having an average particle size of 50 to 300 μm in an amount of 20 to 60 wt % based on the total weight of the polyurethane foam composition.

According to aspects of the present invention, by including in a range of 0.1 to 2 wt % of water as a foaming agent based on the total weight of the polyurethane foam composition, the hardness (ASKER C-Type) has a range of 8 to 40 and a density of 0.05 to 0.35 g/cm$^3$ foam moldings (for example shoe insoles, shoe upper foam packages, etc.) can be manufactured. Water as a foaming agent may be mixed with the polyol component in advance or mixed with the polyol component at the same time as mixing with the isocyanate component later.

The foaming agent, water-blown agent, may contain a predetermined amount of water, which is a low carbon source, in consideration of workability and eco-friendliness, thereby minimizing carbon emission and producing a polyurethane foam molded body having a predetermined density, and water reacts with an isocyanate compound to produce carbon dioxide gas. The present invention has been researched in view the fact that conventionally used foaming agents, such as carbon dioxide, fluorocarbons etc. such as chlorofluorocarbons, hydrocarbons such as pentane and cyclopentane, fluorinated hydrocarbons, or air or nitrogen gas pre-dispersed in the polyol components using an air loading device, are undesirable due to poor workability, environmental harmfulness such as carbon emissions, and high energy costs.

The recycled PU scrap used in the present invention can be recycled by easily separating the scrap of about 35% to 40% generated after cutting the shoe insole shape from the package comprising the foam 10 and fabric 30 in the method of manufacturing a dot bonded shoe insole using an adhesive resin mixed with hydrophobic nanosilica of Korean Patent No. 10-2131606 invented by the same inventor of the present application.

As mentioned above, PU scraps separated from fabrics go through a step-by-step crushing process, and recycled PU scrap powder crushed to an average particle size of 50~300 μm is mixed with raw materials (polyols) to ensure that it is uniformly mixed with raw materials, which is advantageous for securing stable product quality due to good moldability and elasticity.

The particle size or content of the recycled PU scrap powder can be adjusted within a certain range depending on the hardness and density of the desired molded body, but if the average particle size is less than 50 μm, the compatibility with the polyurethane foam composition is poor, and if it exceeds 300 μm, the dispersibility is poor, which may increase the defect rate of the manufactured product after molding.

Accordingly, an aspect of the present invention provides an eco-friendly polyurethane (PU) foam composition composed of water foam, which is mixed with polyol as a first step, and then reacted by adding recycled PU scrap powder as a second step by controlling the process conditions and processing speed through a side-feeder to prevent the viscosity of the raw material from rising, thereby forming a foam sheet for footwear, such as a foam package for shoe insoles or shoe uppers, whose product quality is equivalent to that of conventional products even when a larger amount of recycled material is used.

Figure 1:
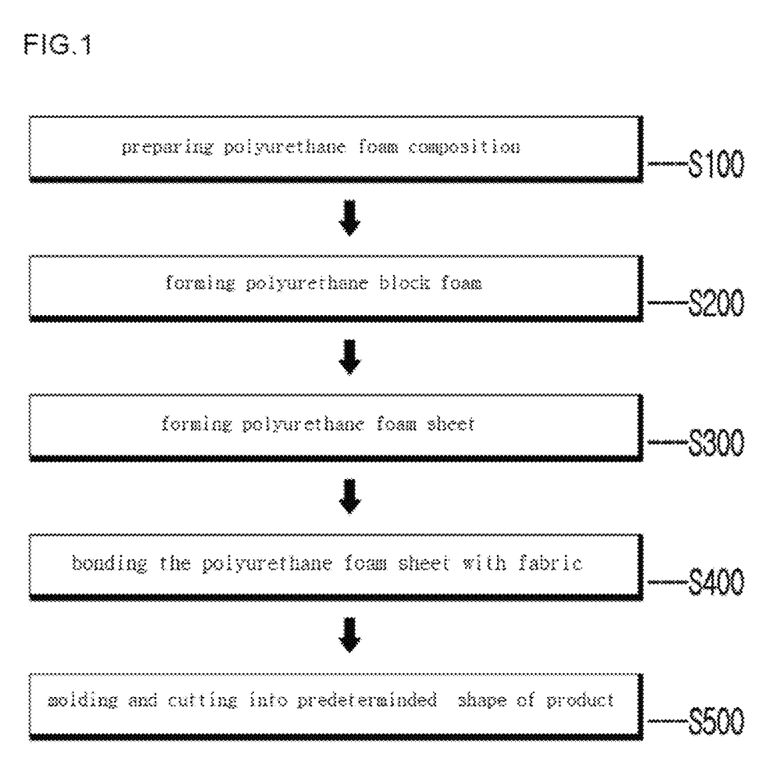
FIG. 1 is a process flow diagram showing a method for manufacturing a foam sheet for shoes according to the present invention.
Figure 2:
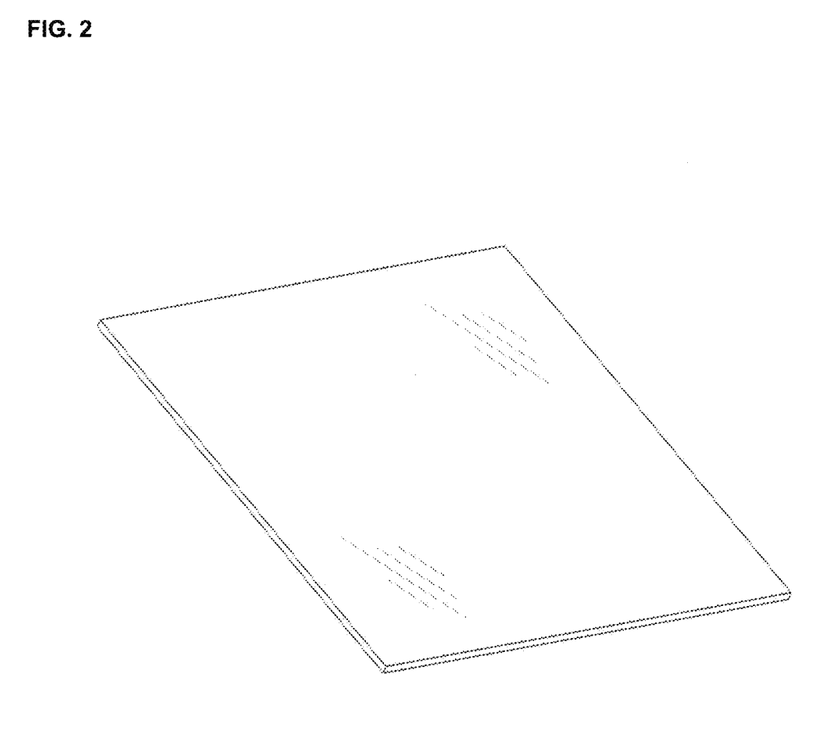
FIG. 2 is a foam sheet for shoes according to an aspect of the present invention.
Figure 3:
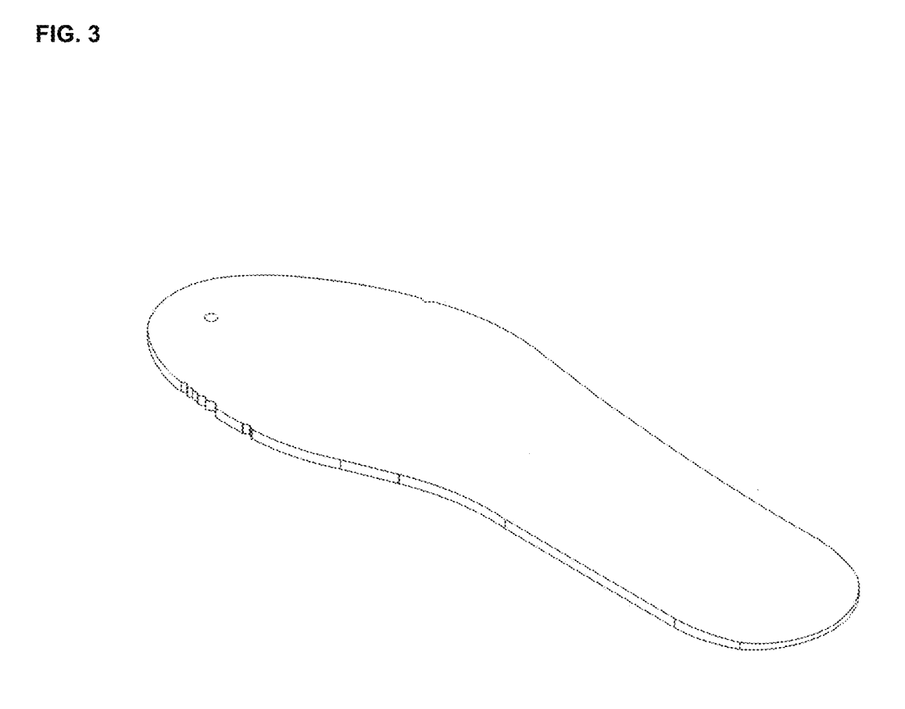
FIG. 3 is an insole for shoes according to an aspect of the present invention.

As shown in FIG. 1, a method for manufacturing a foam sheet for footwear containing recycled PU scrap powder according to aspects of the present invention may include: a polyurethane foam composition comprising as raw materials a polyol, an isocyanate, a chain extender, and in a ratio of 0.1 to 2 wt % of water as a foaming agent, i.e., water-blown agent, based on the total weight of the polyurethane foam composition, a first step of preparing a polyurethane foam composition in which the polyol is mixed with in a ratio of 10 to 20 wt % of recycled PU scrap powder based on the total weight of the polyurethane foam composition, and then isocyanate, a chain extender, and in a ratio of 0.1 to 2 wt % of water as a foaming agent and the resultant are mixed for reaction S100; a second step of adding recycled PU scrap powder via a side-feeder at a ratio of 10 to 40 wt % based on the total weight of said polyurethane foam composition to the resultant composition of the polyurethane foam composition of the first step S100, a third step of cutting the polyurethane block foam to a predetermined thickness to form a polyurethane foam sheet S300; a fourth step of compounding the polyurethane foam sheet cut to the predetermined thickness with a fabric S400; and a fifth step of cutting the fabric-compounded polyurethane foam sheet into a product of a particular shape or, alternatively, placing it in a mold and forming and cutting it into a predetermined product shape by heat pressing S500.

First, in the first step S100 of preparing the above polyurethane foam composition, the polyurethane foam composition is composed of polyol, isocyanate, chain extender, and in a ratio of 0.1 to 2 wt % of water as a foaming agent. The polyol in the raw materials is first mixed with in a range 10 to 20 wt % of recycled PU scrap powder based on the total weight of the polyurethane foam composition, but if the recycled PU scrap powder exceeds 20 wt %, the viscosity of the raw material rises, making it difficult to knead for further foam reaction, resulting in poor reactivity.

For the above reasons, limiting the content of recycled PU scrap powder mixed into the polyurethane foam composition to within 20 wt % has been recognized as a conventional limit for recycling waste, but aspects of the present invention provides a process technology that can include up to 60 wt % of recycled PU scrap powder based on the total weight of the polyurethane foam composition by providing a separate side-feeder for secondary input of the recycled PU scrap powder to facilitate adjustment of the reaction rate according to the composition of the raw materials.

Accordingly, the present invention has confirmed that by adjusting the process conditions and processing speed through a side-feeder provided in the second step S200 of manufacturing the polyurethane block foam, recycled PU scrap powder is added at a ratio of 10 to 40 wt % based on the total weight of the polyurethane foam composition, and by preventing the viscosity of the raw material from rising, it is possible to form a foam sheet for footwear, such as a foam package for a shoe insole or a foam package for a shoe upper, with a product quality equivalent to that of a conventional shoe, despite using a larger amount of recycled material than conventionally.

The third step S300 of forming a polyurethane foam sheet by cutting the polyurethane block foam formed as above to a predetermined thickness in a range of about 1 to about 10 mm (typically 2, 4, 5, 6 mm, etc.); and a fourth step S400 of bonding using the polyurethane foam sheet cut to the predetermined thickness with a fabric. The adhesive used in the step of bonding the polyurethane foam sheet with the fabric of the step S300 is most preferably a liquid adhesive or a hot melt film comprising a resin composition of at least one of thermoplastic polyurethane (TPU) or ethylene vinyl acetate (EVA) having good compatibility with the polyurethane foam sheet.

The adhesive made of the thermoplastic polyurethane (TPU) or ethylene vinyl acetate (EVA) is eco-friendly because a solvent is not used, and is advantageous in securing adhesion to various fabrics due to properties of a flexible material having good workability and productivity. In particular, excellent durability can be secured by maintaining strong adhesion to the polyurethane foam sheet for a long period of time.

Next, the polyurethane foam sheet is made by cutting the polyurethane foam sheet into a specific shape, or putting the polyurethane foam sheet into a mold and molding and cutting the polyurethane foam sheet into a specific shape by a heat press with a temperature of 150~200° C. and a pressure of 40~60 kgf/cm in step S500. When the polyurethane foam sheet is put into the mold and molded by the heat press, when molding by the heat press, it may take about 100 seconds for the shoe insole foam package and about 40 seconds for the shoe upper foam package, respectively.

The one of features of the five-steps, S100~S500, process as described above is that recycled PU scrap powder with an average particle size of 50~300 μm based on the total weight of the polyurethane foam composition is mixed with polyol in the first step, and then recycled PU scrap powder is added in the second step through a side-feeder by controlling the processing speed of the process to prevent the viscosity of the raw material from rising, it is possible to form a foam sheet for footwear, such as a foam package for shoe insoles or shoe uppers, with a product quality equivalent to that of conventional products without deterioration in moldability despite using a larger amount of recycled material than conventional products.

The recycled PU scrap powder has very good chemical miscibility with polyurethane foam compositions, which are polymer resins of the same type, as well as very good molding properties by heat pressing because it is dispersed into particle sizes having the most suitable miscibility, and if the average particle size is less than 50 μm, the miscibility with the polyurethane foam compositions is poor, and if it exceeds 300 μm, the dispersibility is poor, and there is a possibility that the quality (moldability, elasticity) of the product manufactured after molding may be reduced. For the same reason, it is preferred that the maximum particle size of the particles included in the recycled PU scrap powder does not exceed 500 μm.

Hereinafter, a method for manufacturing a foam sheet for shoes containing recycled PU scrap powder according to aspects of the present invention will be described in detail, and aspects of the present invention will be described through preferred embodiments that can be easily performed by a person with ordinary skills in the art to which the present invention belongs.

Example 1

Manufacture of Shoe Insoles

The shoe insole manufactured according to aspects of the present invention is manufactured by polymerizing a polyurethane foam composition composed of, as a raw material, polyol, isocyanate, a chain extender, and water as a foaming agent, and may include the following five steps.

▶ Step 1: a polyurethane foam composition, which include polyol, isocyanate, a chain extender and the range of 0.1 to 2% wt % of water as a foaming agent based on the total weight of the polyurethane foam composition as raw materials, the polyurethane foam composition is prepared by mixing in a range of 10 to 20 wt % recycled PU scrap powder with an average particle size of 150 μm based on the total weight of the polyurethane foam composition to the polyol.
▶ Step 2: A polyurethane block foam is prepared by adding about 10 to about 40 wt % of recycled PU scrap powder having an average particle size of 150 μm based on the total weight of the above polyurethane foam composition through a side-feeder and reacting it.
▶ Step 3: The polyurethane block foam is cut to a thickness of about 4 mm to form a polyurethane foam sheet.
▶ Step 4: The polyurethane foam sheet cut to a thickness of about 4 mm is bonded, i.e., combined, with polyester fiber fabric using a thermoplastic polyurethane (TPU) hot melt film.
▶ Step 5: The polyurethane foam sheet bonded with the above fabric is cut into a product of a specific shape to manufacture a shoe insole.

In manufacturing a shoe insole as in Example 1 above, the average values of the results of multiple evaluations of the moldability and appearance of a polyurethane foam sheet bonded with a fabric by heat pressing into a shoe insole shape in a fifth step according to the proportion of recycled PU scrap powder included in the polyurethane foam composition in the first and second steps are shown in Table 1 below.

TABLE 1

| category | example 1-1 | example 1-2 | example 1-3 | example 1-4 | example 1-5 | example 1-6 | Comparative example 1 |
|---|---|---|---|---|---|---|---|
| (1step) PU Scrap Powder(w %) | 10 | 10 | 15 | 15 | 20 | 20 | 30 |
| (2step) PU Scrap Powder(w %) | 10 | 15 | 20 | 25 | 30 | 40 | 0 |
| Formability and appearance | good | good | good | good | good | good | poor |

Example 2

Manufacture of Foam Package for Shoe Upper

The foam package for shoe uppers manufactured according to the present invention is manufactured by polymerizing a polyurethane foam composition including polyol, isocyanate, chain extender, and water as a foaming agent as raw materials, in the following five steps.

▶ Step 1: polyurethane foam composition including, as raw materials, a polyol and isocyanate and water as a foaming agent in the range of 0.1, to 2 wt % was prepared by mixing the polyol with recycled PU scrap powder having an average particle size of 150 μm in a ratio of 10 to 20 wt % based on the total weight of the polyurethane foam composition.

▶ Step 2: polyurethane block foam is prepared by adding about 10 to about 40 wt % of recycled PU scrap powder with an average particle size of 150 μm based on the total weight of the polyurethane foam composition through a side-feeder.

▶ Step 3: The polyurethane block foam was cut to a thickness of about 2 mm to form a polyurethane foam sheet.

▶ Step 4: The polyurethane foam sheet cut to a thickness of about 2 mm was bonded with PU skin film fabric using a thermoplastic polyurethane (TPU) hot melt film.

▶ Step 5: The polyurethane foam sheet bonded with the above fabric is cut into a product of a specific shape to manufacture a foam package for shoe uppers.

When manufacturing a foam package for a shoe upper as in example 2 above, the average values of the results of multiple evaluations of the moldability and appearance of a polyurethane foam sheet compounded with a fabric by heat pressing into a foam package for a shoe upper according to the proportion of recycled PU scrap powder included in the polyurethane foam composition in the first and second steps are shown in [Table 2] below.

TABLE 2

| category | example 2-1 | example 2-2 | example 2-3 | example 2-4 | example 2-5 | example 2-6 | Comparative example 2 |
|---|---|---|---|---|---|---|---|
| (1 step) PU Scrap Powder(wt %) | 10 | 10 | 15 | 15 | 20 | 20 | 30 |
| (2 step) PU Scrap Powder(wt %) | 10 | 15 | 20 | 25 | 30 | 40 | 0 |
| Formability and appearance | good | good | good | good | good | good | poor |

As shown in [Table 1] and [Table 2] above, the foam packages for shoe insoles prepared by Examples 1-1 to 1-6 and for shoe uppers prepared by Examples 2-1 to 2-6 were found to have excellent quality, such as moldability, adhesion between the fabric and the polyurethane foam sheet, and appearance, it was found that when the amount of recycled PU scrap powder mixed into the polyurethane foam composition in the first step of comparative examples 1 and 2 exceeds 20 wt. %, the viscosity of the raw material increases, making it difficult to knead for further foam reaction and resulting in uneven density and hardness of the product due to poor reactivity.

As described above, The polyurethane foam composition is made by first mixing recycled PU scrap powder of a certain particle size with polyol, and then reacting with the second addition of recycled PU scrap powder by controlling the process conditions and throughput through a side-feeder to prevent the viscosity of the raw material from rising, so it is possible to form a foam sheet for footwear, such as a foam package for shoe insoles or shoe uppers, with a product quality equivalent to that of conventional products despite using a larger amount of recycled material than conventional products.

Experimental Examples

In order to confirm the exemplary properties of the polyurethane foam composition by the present invention, within the range of hardness and density required by the present invention, two kinds of polyurethane foam sheet (shoe insoles, foam package for shoe upper) containing recycled PU scrap powder with an average particle size of about 150 μm in the range of 50% by weight as shown in Example 1-5 and Example 2-5 were manufactured under the same conditions as the conventional heat press (temperature 150~200° C. & pressure 40~60 kgf/cm), The results of several physical properties tests are shown in Table 3 below.

TABLE 3

| Properties | unit | Shoe insoles | Foam package for shoe upper |
|---|---|---|---|
| hardness(ASKER C) | — | 21/25/28/29/27 | 19/19/19/20/20 |
| density | g/cm$^3$ | 0.18/0.16/0.16 | 0.14/0.15/0.15 |
| Tear Strength | kgf/cm | 2.5/2.3/2.1 | 1.8/1.8/2.0 |
| Tensile strength | kgf/cm$^2$ | 4.6/4.6/4.8 | 3.8/3.5/3.6 |
| Elongation rate | % | 105/109/101 | 123/110/118 |
| Shrinkage rate | % | 0.10/0.25/0.30 | 0.09/0.15/0.20 | hardness: ASKER C Type Durometer based on JIS K 7312

As shown in [Table 3], the foam sheet for shoes containing recycled PU scrap powder according to the present invention is obtained by first mixing the recycled PU scrap powder with polyol and then by reacting with secondary addition of recycled PU scrap powder through a side-feeder, the overall physical properties such as tear strength, tensile strength, elongation, and shrinkage can be manufactured to the same level as conventional polyurethane foam sheets that do not contain recycled PU scrap powder. It was confirmed that the polyurethane foam molded body has a hardness (ASKER C-Type) of 8 to 40 and a density of 0.05 to 0.35 g/cm$^3$.

Figure 4:
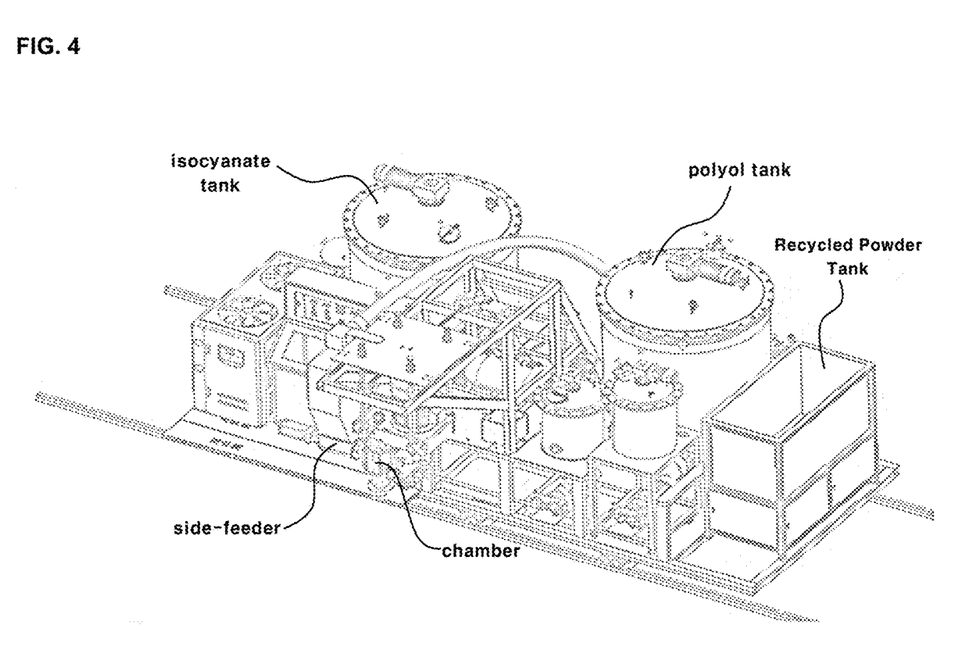
FIG. 4 illustrates an apparatus for producing polyurethane foam sheet according to an aspect of the present invention.

FIG. 4 illustrates an apparatus for producing polyurethane foam sheet in accordance with an aspect of the present invention.

Referring to FIG. 4, an apparatus for producing polyurethane foam sheet in accordance with an aspect of the present invention may include an isocyanate tank, a polyol tank, a recycled power tank, a chamber, and a side-feeder. However, it is not limited thereto.

Therefore, the shoe foam sheet containing recycled PU scrap powder manufactured by aspects of the present invention can be replaced, modified, and changed in various forms without departing from the technical spirit of the present invention, and is especially environmentally friendly and improves productivity and foam packages for various shoe insoles and shoe uppers (decoration) that have the advantage of reducing manufacturing costs and require uniform formability and durability, as well as clothing, bags, and sporting goods made of fiber, natural and synthetic leather, plastic, etc. It can be applied to a variety of applications that require functions such as molding materials, cushioning materials, and fillers used inside household goods, industrial products, etc.

What is claimed is:

1. A method of producing foam sheet containing recycling polyurethane (PU) scrap powder for shoes using a polyurethane foam composition comprising: as raw materials polyol, isocyanate, a chain extender, and water as a foaming agent in a ratio of 0.1 to 2 wt %, the method comprising:
   a step of mixing in a ratio of 10-20 wt % recycled PU scrap powder based on the total weight of the polyurethane foam composition with the polyol to form a polyol mixture;
   a mixing step of the isocyanate, the chain extender, and in a range of 0.1 to 2 wt % of water as a foaming agent based on the total weight of the polyurethane foam composition to the polyol mixture to form the polyurethane foam composition;
   a step of preparing a polyurethane block foam by adding the recycled PU scrap powder in a ratio of 10-40 wt % based on the total weight of the polyurethane foam composition to the polyurethane foam composition through a side feeder;
   a step of cutting the polyurethane block foam to a predetermined thickness to form a polyurethane foam sheet;
   a step of combining the polyurethane foam sheet cut to the predetermined thickness with a fabric; and
   a step of cutting the polyurethane foam sheet combined with the fabric into a predetermined shape of product, or placing it in a mold and molding and cutting it into a predetermined shape of product by using heat pressing.

2. The method of producing foam sheet containing recycled PU scrap powder for shoes of claim 1, wherein the recycling PU scrap powder is an average particle size in a range of 50~300 μm.

3. The method of producing foam sheet containing recycled PU scrap powder for shoes of claim 1, wherein an adhesive used in a step combining polyurethane foam sheet with the fabric is a liquid adhesive or hot melt film comprising a resin composition of at least one selected from the group consisting of thermoplastic polyurethane (TPU) or ethylene vinyl acetate (EVA).

4. The method of producing foam sheet containing recycled PU scrap powder for shoes of claim 1, wherein the predetermined shape of product is any one of a shoe insole foam package or a shoe upper foam package.

* * * * *